(12) United States Patent
Creed et al.

(10) Patent No.: US 10,929,243 B2
(45) Date of Patent: Feb. 23, 2021

(54) SERVICE-LEVEL REBUILD

(71) Applicant: EMC IP Holding Company LLC, Hopkinton, MA (US)

(72) Inventors: John Creed, Innishannon (IE); Owen Martin, Hopedale, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 34 days.

(21) Appl. No.: 16/381,636

(22) Filed: Apr. 11, 2019

(65) Prior Publication Data

US 2020/0327014 A1     Oct. 15, 2020

(51) Int. Cl.
*G06F 11/14*     (2006.01)
*G06F 11/16*     (2006.01)
*G06F 3/06*      (2006.01)

(52) U.S. Cl.
CPC .......... *G06F 11/1451* (2013.01); *G06F 3/065* (2013.01); *G06F 3/0619* (2013.01); *G06F 3/0689* (2013.01); *G06F 11/1662* (2013.01)

(58) Field of Classification Search
CPC ............ G06F 11/1451; G06F 11/1662; G06F 3/0619; G06F 3/065; G06F 3/0689
See application file for complete search history.

(56) References Cited

U.S. PATENT DOCUMENTS

| | | | |
|---|---|---|---|
| 10,198,205 B1* | 2/2019 | Freilich | G06F 3/061 |
| 10,642,690 B1* | 5/2020 | Tian | G06F 3/0619 |
| 2009/0265360 A1* | 10/2009 | Bachwani | G06F 11/008 |
| 2015/0301895 A1* | 10/2015 | Dennett | G06F 11/1092 |
| | | | 714/6.24 |
| 2017/0115901 A1* | 4/2017 | Franke | G06F 11/1076 |
| 2019/0171363 A1* | 6/2019 | Hardy | G06F 3/067 |

OTHER PUBLICATIONS

Martin, "Using Response Time Objectives in a Storage System," U.S. Appl. No. 16/281,663, filed Feb. 21, 2019, 135 pages.

* cited by examiner

*Primary Examiner* — Ryan Bertram
(74) *Attorney, Agent, or Firm* — Amin, Turocy & Watson, LLP

(57) ABSTRACT

Techniques are provided for service-level rebuild of one or more storage drives. Storage drives can store data of varying priority levels. In an example, when a storage drive is rebuilt, higher-priority data is written to the rebuilt storage drive before lower-priority data. In some examples where multiple storage drives are being rebuilt, a system can prioritize a use of rebuild bandwidth in rebuilding storage drives.

20 Claims, 11 Drawing Sheets

400

| LOWER-PRIORITY DATA 404a | HIGHER-PRIORITY DATA 402a | LOWER-PRIORITY DATA 404b | HIGHER-PRIORITY DATA 402b |
|---|---|---|---|

| CURRENT STATE 1002 ↓ / NEXT STATE 1004 → | Full 1006b | Partial 1008b | Unprotected 1010b | Marginal 1012b | Degraded 1018 | Critical 1014b | Data Loss 1016b |
|---|---|---|---|---|---|---|---|
| Full 1006a | Normal behavior 1020aa | Some hot spares are failed/removed 1020ab | All hot spares are failed/removed 1020ac | Single member of raid group fails 1020ad | Single member of raid group fails and all hot spares removed 1020ae | Multiple Raid groups with single member failure 1020af | Multiple members of raid group fail leaving data unrecoverable 1020ag |
| Partial 1008a | Hot spares are fully replenished 1020ba | Waiting for enough spares to be added 1020bb | All hot spares are failed/removed 1020bc | Single member of raid group fails 1020bd | Single member of raid group fails and no hot spares 1020be | Multiple Raid groups with single member failure 1020bf | Multiple members of raid group fail leaving data unrecoverable 1020bg |
| Unprotected 1010a | Hot spares are fully replenished 1020ca | Some spares are added but less than minimum 1020cb | Waiting for enough spares to be added 1020cc | Single member of raid group fails at the same time a hot spare is added 1020cd | Single member of raid group fails 1020ce | Multiple Raid groups with single member failure 1020cf | Multiple members of raid group fail leaving data unrecoverable 1020cg |
| Marginal 1012a | Rebuild completes and hot spares fully replenished 1020da | Rebuild completes, some hot spares exist but less than minimum 1020db | Rebuild completes but no hot spares remaining 1020dc | Single member rebuild is progressing 1020dd | Hot spare fails during single member rebuild 1020de | Rebuild takes too long OR another raid group has a failure 1020df | Another member fails in the raid group before the rebuild completes 1020dg |
| Critical 1014a | All rebuilds complete and hot spares fully replenished 1020ea | All rebuilds complete and some spares exist but less than min 1020eb | All rebuilds complete with no hot spares remaining 1020ec | Some rebuilds complete with only 1 remaining 1020ed | Rebuilds complete but other failures remain without any spares 1020ee | Remains in this state until serviced or another failure occurs 1020ef | Another member fails in the raid group before the rebuild completes 1020eg |
| Data Loss 1016a | External data recovery and full spare replenishment 1020fa | External data recovery with less than min spares 1020fb | External data recovery and no spares 1020fc | External data recovery and other rebuild progressing 1020fd | External data recovery and single failure remains 1020fe | External data recovery and multiple failures remains 1020ff | Waiting on external data recovery 1020fg |

SERVICE-LEVEL REBUILD

TECHNICAL FIELD

The present application relates generally to writing data to a hard drive or rebuilding a hard drive.

BACKGROUND

A hard drive can store data of various service levels. That is, data at a higher service level can come with a stronger guarantee of latency to access, or redundancy, than data at a lower service level. A hard drive can be part of a redundant array of inexpensive disks (RAID), in which data of various service levels is stored.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which:

FIG. 4 illustrates an example storage drive in which a service-level rebuild can be implemented, in accordance with certain embodiments of this disclosure;

FIG. 10 illustrates an example state transition matrix for a service-level rebuild, in accordance with certain embodiments of this disclosure;

DETAILED DESCRIPTION

Overview

Figure 1:
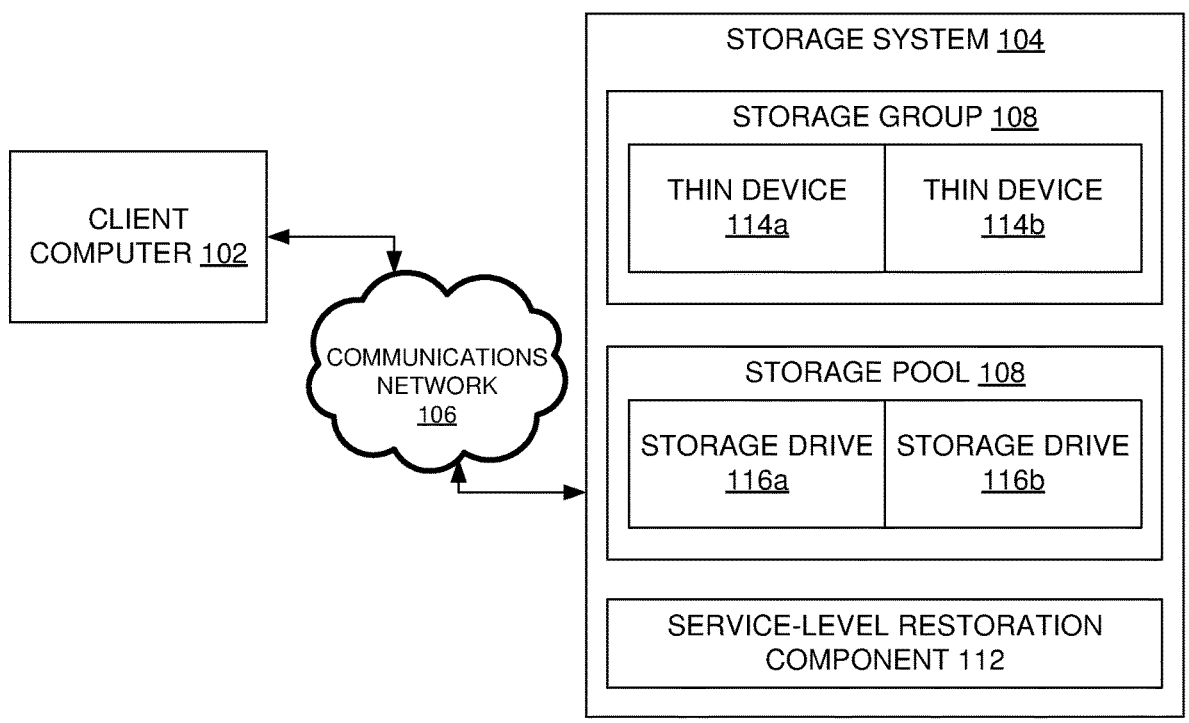
FIG. 1 illustrates a block diagram of an example computer system that can facilitate a service-level rebuild, in accordance with certain embodiments of this disclosure.

Some hard drives and storage configurations can have elongated rebuild times due to their older hardware technology and redundant array of independent drives (RAID) configurations. With V3 local RAID, and more recently with adoption of flash drives and all-flash arrays, rebuild times can become significantly faster. As the size of flash drives increases, rebuild times then increase correspondingly.

There are cases where there has been a single drive failure, and subsequently one or more other drives fails, causing a dual drive failure. In some cases, such a dual drive failure can lead to data uncertainty or data loss.

Dual drive failure can occur due to bad luck when one drive fails and it is not replaced in a timely-enough fashion (e.g., it is not hot spared or auto replaced within a machine with either a permanent or a temporary spare drive), and then another member or mirror fails, causing a dual drive failure.

Another situation can be when a drive has failed, and the drive is replaced. For instance, a field team can have done its due diligence and replaced the drive immediately, or the drive has been hot spared or auto replaced within the machine. However, the machine can be so busy servicing other workloads that the rebuild or copy process is extremely elongated. This increased rebuild time can create an added level of vulnerability and a greater window of opportunity whereby the probability for an additional drive failure of another member or mirror before the rebuild completes is increased.

A solution to these problems of dual drive failures can be to guaranteeing that, when a drive is rebuilding or copying and its protection is currently compromised such that there is no longer redundancy available should another member or mirror fail, the copy or rebuild will complete within a certain time frame, depending on an associated service level. For a given physical drive, there can be a certain amount of high-priority data (which can be referred to as diamond data), with the rest of the data being associated with other service level priorities.

In such scenarios, a solution to the above problems can involve prioritizing the data that is rebuilt, and monitor the time taken, such that the higher-level priority data is rebuilt first. This approach can also employ machine learning and provide an estimated time for when it expects to have rebuilt the higher-level priority data on a particular physical disk, as well as when it expects to fully complete rebuilding or copying the entire drive.

This information and learning can then be used to create a deadline for when the higher-priority data should be rebuilt, such that the rebuild or copy of this higher-priority data is completed in a timely fashion. Similarly, an expected completion time for the rebuild or copy of the entire disk should also have a deadline set, and either dial home indicating that the drive is taking too long to rebuild, or have the higher level management of disk drive enclosures' hardware controllers and processing units allocate some more resources, or give a higher priority to finishing out the rebuild of the whole drive, including the data for the lower priorities on this drive, which has a rebuild process that has become protracted.

A storage array can achieve efficiencies by amortizing a high-performance common hardware platform across a plurality of consolidating workloads. Such efficiencies can carry a risk whereby a critical application can be spread across multiple individual media devices, increasing the likelihood of impact from a dual failure. In an approach, this risk can be balanced against a relative business priority of the application data. A reinforcement learning approach can be utilized to align rebuild bandwidth with service levels of data to ensure that a risk of exposure during failure to critical applications is mitigated.

A benefit of a service-level rebuild according to the present techniques can be an improved response time experienced by the customer when their host accesses high priority data on a drive which is currently undergoing rebuild. Since which data is rebuilt first can be prioritized, there can be a much higher probability when implementing the present techniques, that when the customer goes to access their high priority data on the disk that is undergoing rebuild that their higher service level tier data will already have been rebuilt due to this new prioritization. This can create an additional performance benefit for the customer. In contrast, as it stands currently, when a host accesses data on a disk that undergoing rebuild and the specific data accessed is not yet rebuilt, this host I/O can stall and wait while the specific data required in order to rebuild the data the customer has requested is then immediately fetched from all the other members in the RAID group in order to rebuild the required data and service the I/O. This stall waiting for this data to be fetched from all members and rebuilt can involve additional data retrieval operations, memory operations, and processing than otherwise if the data was already rebuilt and therefore can come with a performance penalty for the customer, which the present techniques can help to provide some mitigation against.

When a drive is rebuilding or copying, and its protection is currently compromised, such that there is no longer redundancy available should another member or mirror fail, efforts can be made to ensure that a copy or rebuild time for the drive is commiserate with the service level of data it holds. For example, a 16 terabyte (TB) not- and (NAND) device can be likely to have a certain amount of high-priority data, with the rest being associated with other service level priorities.

In the course of achieving this, a front end storage group's physically inconsistent tracks can be monitored over time. In examples where the majority of time is spent with values of zero, this monitoring can be combined with a Markov model to compensate for the system being fully available for the majority of time. A system can be said to have the following states: fully protected (no failures, and a required number of spares are present); partially protected (no failures, and fewer than the required number of spares—but more than zero—are present); unprotected (no failures, and no spares are present); degraded (media has failed and is rebuilding); and critically degraded (media has failed, and is unable to be rebuilt).

Populating a Markov model system can be performed by periodically dialing home samples of degraded tracks, such as daily. These samples can be aggregated across different media types and hardware platforms to provide a baseline probability of state changes while the system is accumulating its own probability of state changes. With systems with similar hardware platforms, a probability of transitioning into degraded and back again can be determined. However, in some examples, transitioning between partial or unprotected states can be a function of individual site policies. For these transitions, customers who have multiple systems can have baseline probabilities that indicate a responsiveness of a support chain in restoring systems from partially protected to fully protected. These probabilities can be continually refined and pushed back to systems in the field based on learned behavior from peers.

A forecast per storage group can be provided based on a number of degraded capacity, and input/output (I/O) to degraded capacity using 2 Exponential Moving Average (2 EMA), short-term two hour half-life, and long-term 10 hour half-life. A goal function can be defined as a basis for a reinforcement learning approach to judge risk for each storage group. Each time a storage group transitions from protected to degraded, a goal can be reset.

Such a goal function can be expressed as:

Goal=(Long-Term Degraded Bytes)*(Long-Term Degraded Input/Output Per Second (IOPS))*(Short-Term Degraded Bytes)/(Long-Term Degraded Bytes)

A purpose of the goal function can be to balance an amount of capacity and an amount of IOPS against a time that a rebuild is taking. A rebuild can minimize a degraded capacity over time, which will cause Goal in the goal function above to reach zero. This can also cause the final term to minimize the goal, because Short-Term Degraded Bytes will be less than Long-Term Degraded Bytes as long as progress is being made. If there is a block in progress, then eventually Short-Term Degraded Bytes will equal Long-Term Degraded Bytes, which will cause Goal to reflect the magnitude of exposure in terms of capacity and IOPS.

An active control in the system can be an ability to direct rebuild bandwidth. In an example, every five minutes, the system can re-determine the goal function for each storage group, and can evaluate each storage group one service level at a time. The system can then proceed to do a directed rebuild based on the thin devices within a storage group. Once the high-priority storage groups have transitioned out of a degraded state, the system can move on to the next lower service level until all storage groups are corrected.

A solution according to the present techniques can allow for storage administrators to bolster support of mission-critical applications while achieving benefits of consolidation. Such a system according to the present techniques can include an approach to rebuild RAID groups based on a virtualization layer; a Markov model for predicting a likelihood of requiring a rebuild; a goal function to direct rebuild bandwidth in a weighted priority fashion and provide alerting; and a distributed learning system where similar configurations can be clustered, and feedback is provided.

Example Architecture

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example computer system 100 that can facilitate a service-level rebuild, in accordance with certain embodiments of this disclosure. Computer system 100 comprises client computer 102, storage system 104, and communications network 106. In some examples, each of client computer 102, storage system 104, and communications network 106 can be implemented with aspects of system 1100 of FIG. 11. Storage system 104 can provide computer storage resources, which can be accessed by client computer 102 via communications network 106 (which, in some examples, can be the Internet).

Client computer 102 can execute one or more computer applications that accesses data stored by storage system 104. In some examples, client computer can have a service-level priority with storage system 104 that specifies some quality of the data stored by storage system 104—e.g., an amount of redundancy or a latency to access. In an example, this service-level priority can be associated with a priority of data stored. When a storage drive of storage system 104 fails (E.g., storage drive 116a) and is rebuilt, the data that is rebuilt may be written in accordance with its priority (i.e., higher-priority data can be written as part of a rebuild before lower-priority data).

Storage system 104 comprises storage group 108, storage pool 110, and service-level restoration component 112. It can be appreciated that there can be embodiments that implement multiple storage groups and/or storage pools.

Storage group 108 can comprise a plurality of thin devices, depicted here as thin device 114a and thin device 114b. A thin device, such as thin device 114a and thin device 114b, can appear to client computer 102 as one or more logical volumes (sometimes referred to as logical devices) containing contiguous blocks of data storage. Each of thin device 114a and thin device 114b can contain pointers to some or all of the data stored by storage pool 110 (including storage drive 116a and storage drive 116b). In some examples, a thin device can be presented to client computer 102 as having a capacity with a corresponding logical block address (LBA) range.

Storage pool 110 can comprise a plurality of storage drives, depicted here as storage drive 116a and storage drive 116b. In some examples, storage drive 116a and storage drive 116b can be configure in a RAID configuration.

Figure 7:
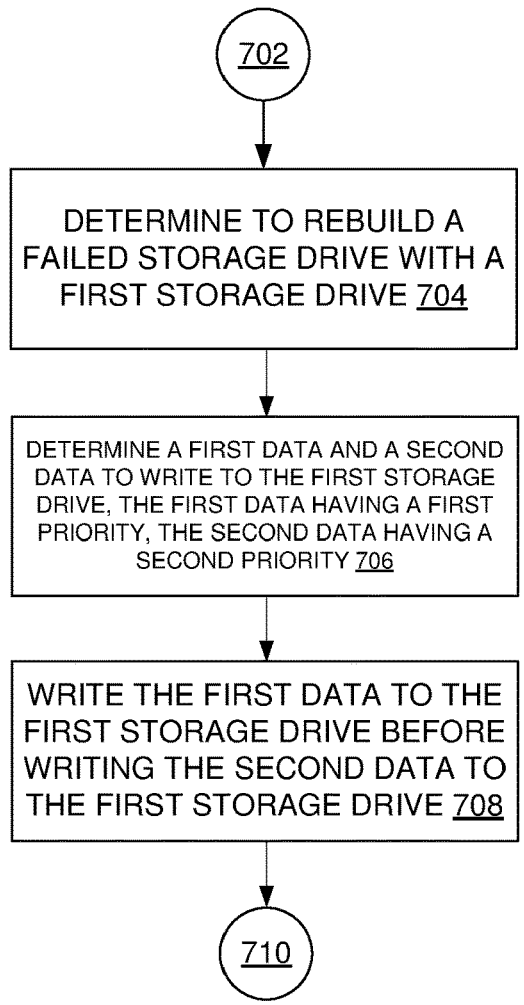
FIG. 7 illustrates an example process flow for service-level rebuild, in accordance with certain embodiments of this disclosure.
Figure 8:
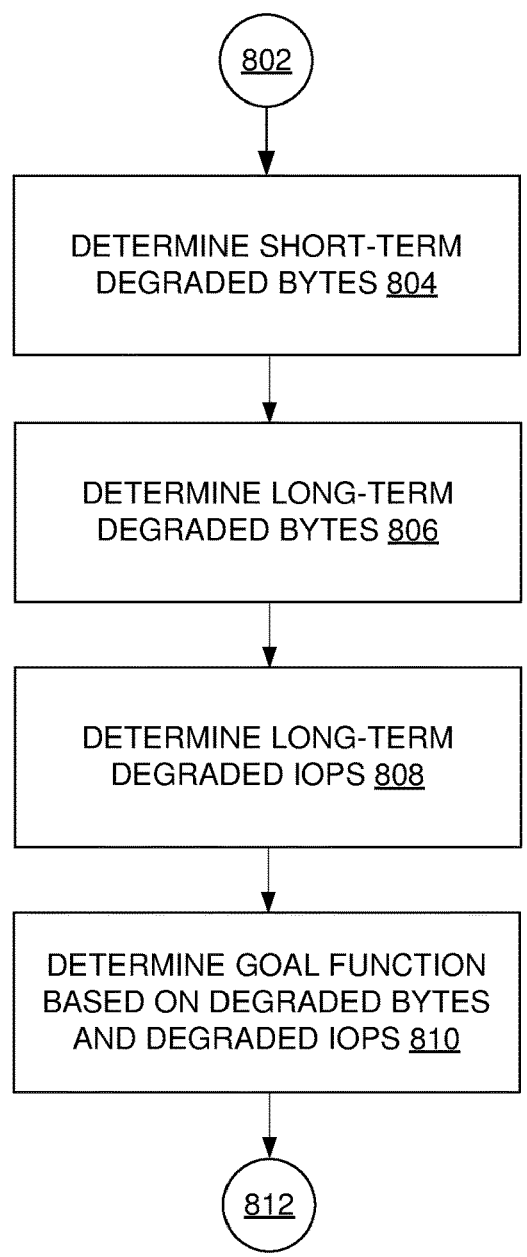
FIG. 8 illustrates an example process flow for implementing a goal function for a service-level rebuild, in accordance with certain embodiments of this disclosure.
Figure 9:
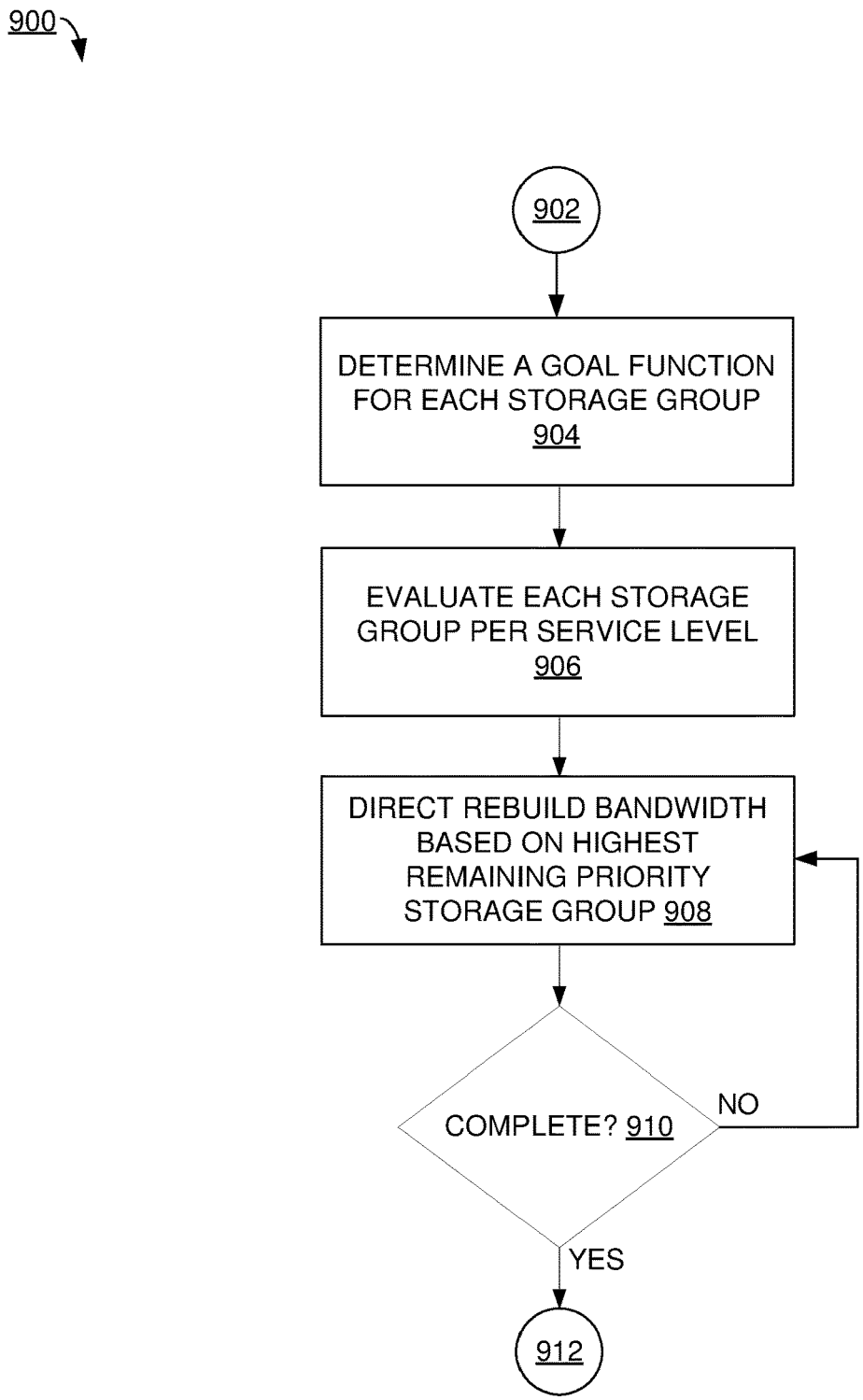
FIG. 9 illustrates an example process flow for changing a priority for rebuild bandwidth, in accordance with certain embodiments of this disclosure.

In some examples, service-level restoration component 112 can implement aspects of process flow 700 of FIG. 7, process flow 800 of FIG. 8, and/or process flow 900 of FIG. 9 as part of performing service-level restoration to storage pool 110—for example to rebuild a storage drive to store data that was stored on storage disk 116a before storage disk 116a failed. Similarly, in some examples, service-level restoration component 112 can utilize state transition matrix 1000 of FIG. 10 as part of performing service-level restoration to storage pool 110. Service-level restoration component 112 can sometimes be referred to as performing a service-level restoration for storage group 108, which can have thin device 114a and/or thin device 114b reference data stored on storage pool 110.

Figure 2:
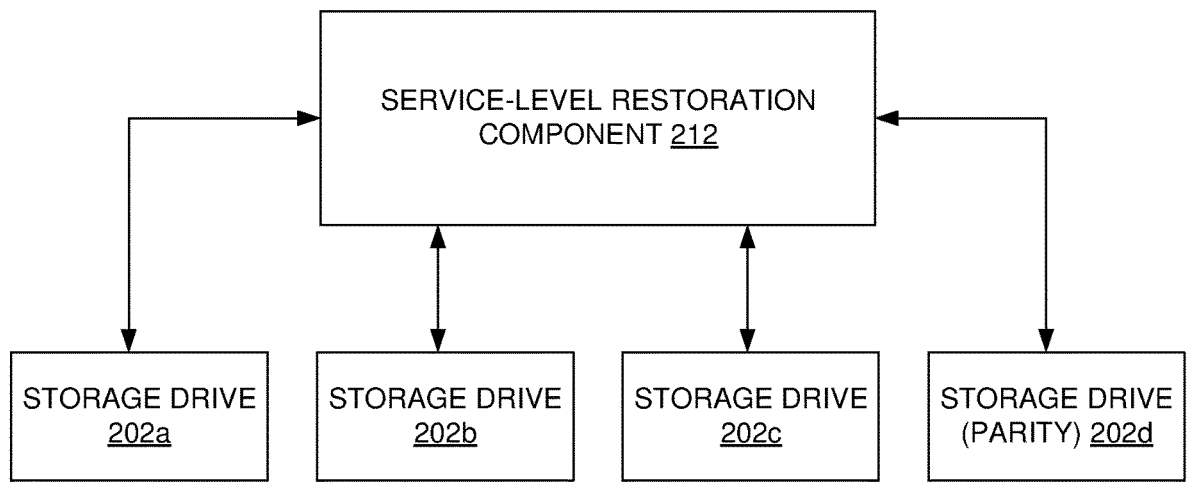
FIG. 2 illustrates an example of one storage pool in which a service-level rebuild can be implemented, in accordance with certain embodiments of this disclosure.

FIG. 2 illustrates an example of one storage pool 200 in which a service-level rebuild can be implemented, in accordance with certain embodiments of this disclosure. As depicted, storage pool 200 comprises storage drive 202a, storage drive 202b, storage drive 202c, and storage drive 202d. It can be appreciated that there can be examples of storage pools that implement more or fewer storage drives than are depicted with storage pool 200.

Storage pool 200 can have various states, including full, partial, unprotected, marginal, critical, and data loss. A state of full can indicate that storage pool 200 is exhibiting normal behavior and has a full set of hot spares, where a hot spare can be a storage drive that is powered on and connected to storage pool 200, so that a hot spare can be called into service should another active storage drive be needed for storage pool 200. A number of hot spares that is considered to be a full set of hot spares can be set by an administrator of storage pool 200. A state of partial can indicate that storage pool 200 is exhibiting normal behavior, but lacks a full set of hot spares (e.g., some hot spares have failed or been removed from storage pool 200). A state of unprotected can indicate that storage pool 200 is exhibiting normal behavior, but there are no hot spares (e.g., all hot spares have failed or been removed). A state of marginal can indicate that storage pool 200 has had a single member of the active drives of the storage pool fail. A state of degraded can indicate that storage pool 200 has had a single storage drive fail, and there are no hot spares. A state of critical can indicate that storage pool 200 has had a single storage drive fail, and that another storage pool has had a single storage drive fail. A state of data loss can indicate that storage pool 200 has had multiple storage drives fail, leaving data unrecoverable from storage pool 200 itself (though, there can be examples where the data can be recovered from a source that is external to storage pool 200).

In some examples, the storage drives of storage pool 200—i.e., storage drive 202a, storage drive 202b, storage drive 202c, and storage drive 202d—can be associated in a RAID configuration. In such a RAID configuration, one storage drive—e.g., storage drive 202d—can serve as a parity drive, where it stores parity information that indicates information about corresponding information on the other drives of the RAID configuration. For example, the parity information can comprise an XOR (exclusive-or) of the other corresponding blocks in the RAID configuration, so that if one storage drive is lost, the data on the storage drive can be recreated from the other storage drives, including the parity drive. In other examples, parity can be used for the RAID configuration, but the parity is striped across multiple drives of a storage pool. Parity information in a RAID configuration is an example of how storage pool 200 can implement redundancy and data protection.

Service-level restoration component 212 can be similar to service-level restoration component 112 of FIG. 1. Where a drive—e.g., storage drive 202a—of storage pool 200 fails, service-level restoration component 212 can rebuild the data from that failed storage drive on a new storage drive.

Figure 3:
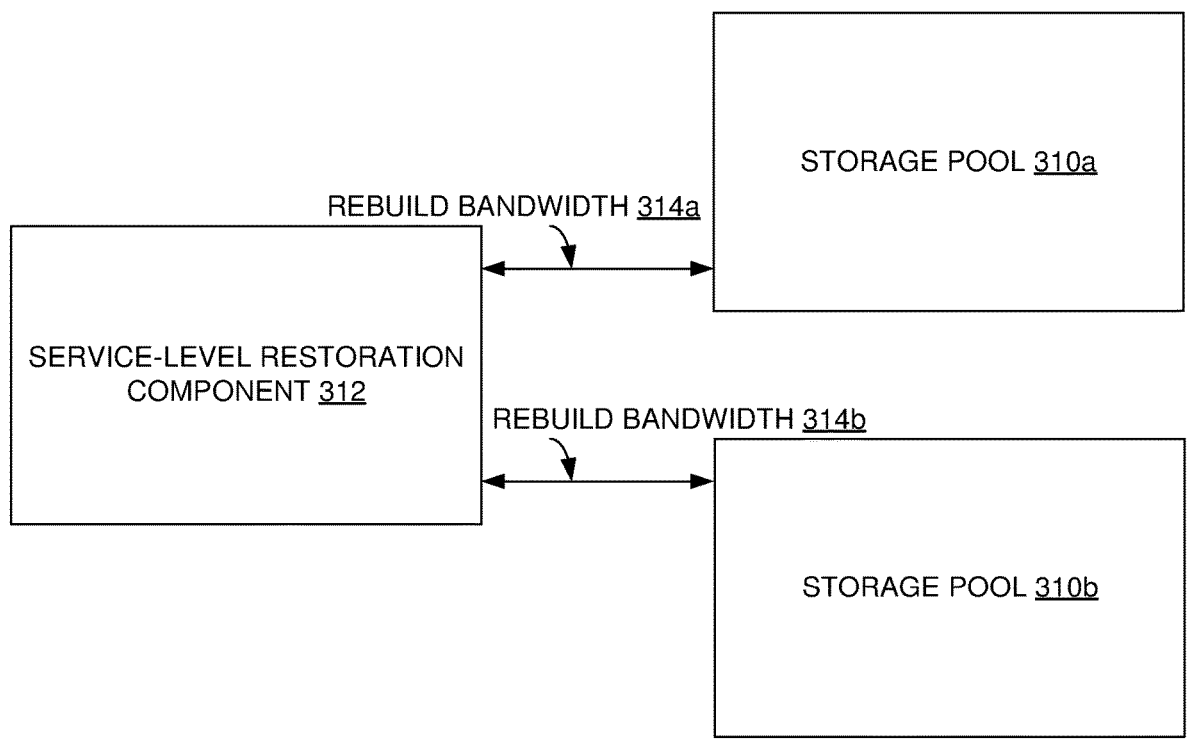
FIG. 3 illustrates an example of two storage pool in which a service-level rebuild can be implemented, in accordance with certain embodiments of this disclosure.

FIG. 3 illustrates an example of two storage pools 300 in which a service-level rebuild can be implemented, in accordance with certain embodiments of this disclosure. As depicted, storage pools 300 comprises storage pool 310a, storage pool 310b, and service-level restoration component 312. In some examples, each of storage pool 310a and storage pool 310b can be similar to storage pool 110 of FIG. 1, and service-level restoration component 312 can be similar to service-level restoration component 112 of FIG. 1.

In some examples, a storage drive of storage pool 310a can have failed, and service-level restoration component 312 can be rebuilding a corresponding storage drive for storage pool 310a. Similarly, after a storage drive of storage pool 310a has failed and before a corresponding storage drive has been rebuilt, a storage drive of storage pool 310b can have failed, and service-level restoration component 312 can be rebuilding a corresponding storage drive for storage pool 310b. Thus, service-level restoration component 312 can be rebuilding a storage drive for each of multiple storage pools concurrently.

Storage pools 300 can have a finite amount of bandwidth with which to rebuild storage drives. This can sometimes be referred to as rebuild bandwidth. In some examples, this rebuild bandwidth can be limited based on an amount of processing resources that service-level restoration component 312 has available to perform storage drive rebuilds. As depicted, rebuild bandwidth for service-level restoration component 312 is made up of rebuild bandwidth 314a, which is directed to rebuilding a storage drive of storage pool 310a, and rebuild bandwidth 314b, which is directed to rebuilding a storage drive of storage pool 310b. An amount of rebuild bandwidth directed to rebuilding a storage drive of storage pool 310a can be determined based on a priority of rebuilding the storage drive of storage pool 310a relative to other rebuilds. In some examples, this priority can be determined by implementing process flow 900 of FIG. 9 for storage pools 300.

This rebuild bandwidth can be periodically redirected based on updated priorities. In some examples, service-level restoration component 312 can determine an updated priority for each rebuild every five minutes, and direct its rebuild bandwidth accordingly until a rebuild completes, or the priority is updated again five minutes later.

FIG. 4 illustrates an example storage drive 400 in which a service-level rebuild can be implemented, in accordance with certain embodiments of this disclosure. While storage drive 400 is depicted logically, it can be appreciated that storage drive 400 can be implemented with a variety of different types of computer storage drives, such as a solid-state drive (SSD) or a hard disk drive (HDD).

The data stored on storage drive 400 has different priorities. Depicted are higher-priority data 402a, higher-priority data 402b, lower-priority data 404a, and lower-priority data 404b. In a service-level rebuild (such as one implemented by service-level restoration component 112 of FIG. 1), it can be that higher priority data is written to a new storage drive as part of the rebuild before lower priority data is written to the new storage drive. In the example of storage drive 400, this can mean that higher-priority data 402a and higher-priority data 402b is written to the new storage drive before lower-priority data 404a and lower-priority data 404b is written to the new storage drive. This priority-based writing (which can be referred to as a service-level rebuild) can be performed independent of where the data of various priorities is located on storage drive 400.

Figure 5:
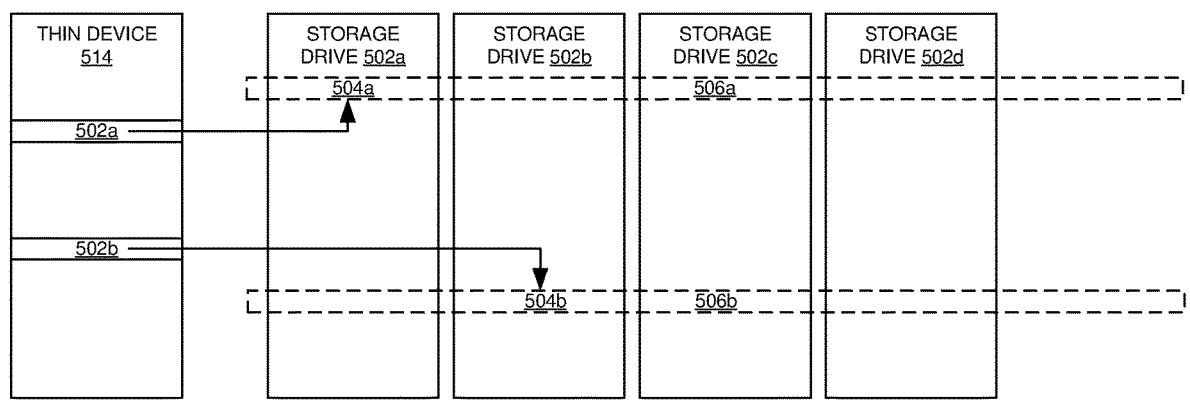
FIG. 5 illustrates an example architecture where data with a priority is mapped between a thin device and a storage pool, in accordance with certain embodiments of this disclosure.

FIG. 5 illustrates an example architecture 500 where data with a priority is mapped between a thin device and a storage pool, in accordance with certain embodiments of this disclosure. As depicted, example architecture comprises thin device 514, storage drive 516a, storage drive 516b, storage drive 516c, and storage drive 516d. In some examples, thin device 514 can be similar to thin device 114a or thin device 114b of FIG. 1. Each of storage drive 516a, storage drive 516b, storage drive 516c, and storage drive 516d can be similar to storage drive 116a or storage drive 116b of FIG. 1. Together, storage drive 516a, storage drive 516b, storage drive 516c, and storage drive 516d can be part of a storage pool.

As depicted, storage drive 516a, storage drive 516b, storage drive 516c, and storage drive 516d are arranged in a RAID 3+1 configuration, where storage drive 516a, storage drive 516b, and storage drive 516c can store file data, and storage drive 514d can store parity information about the data stored on storage drive 516a, storage drive 516b, and storage drive 516c.

Portions of drive 516a, storage drive 516b, storage drive 516c, and storage drive 516d can be logically allocated into units—depicted here as unit 506a and unit 506b. LBA 502a of thin device 514 maps to data 504a of unit 506a as stored on storage drive 516a. Similarly, LBA 502b of thin device 514 maps to data 504b of unit 506b as stored on storage drive 516c.

Inasmuch as data can have an associated priority, as described herein, when a storage drive is rebuilt, a service-level rebuild according to the present techniques can be implemented can by writing the units associated with higher priority data before writing the units associated with lower priority data. In some examples, where a unit has any data with a higher priority than the data of another unit, then that unit as a whole is considered to have a higher priority than that other unit.

Figure 6:
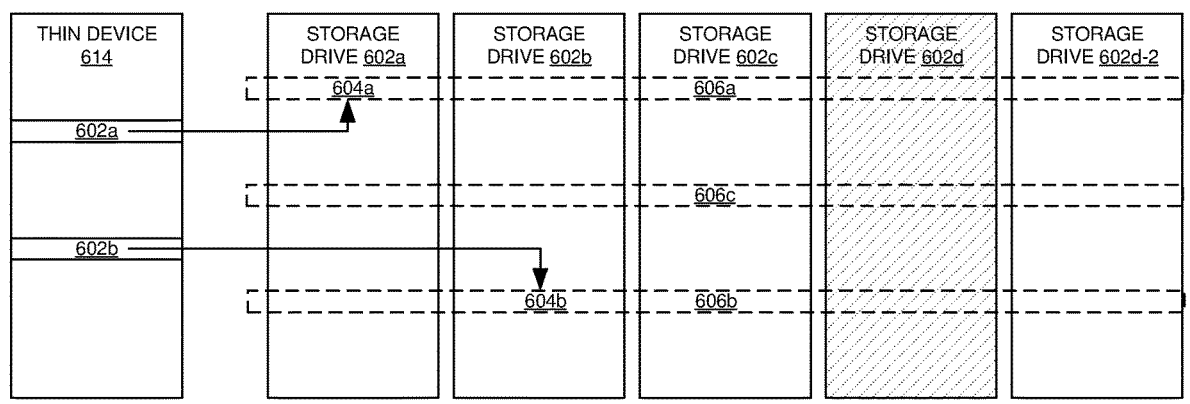
FIG. 6 illustrates an example architecture where data with a priority is rebuilt according to a service-level rebuild, in accordance with certain embodiments of this disclosure.

FIG. 6 illustrates an example architecture 600 where data with a priority is rebuilt according to a service-level rebuild, in accordance with certain embodiments of this disclosure. As depicted, example architecture comprises thin device 614, storage drive 616a, storage drive 616b, storage drive 616c, storage drive 616d, and storage drive 616d-2. In some examples, thin device 614 can be similar to thin device 114a or thin device 114b of FIG. 1. Each of storage drive 616a, storage drive 616b, storage drive 616c, storage drive 616d, and storage drive 616d-2 can be similar to storage drive 116a or storage drive 116b of FIG. 1. Together, storage drive 616a, storage drive 616b, storage drive 616c, storage drive 616d, and storage drive 616d-2 can be part of a storage pool.

In the example of example architecture 600, storage drive 616d has failed, and storage drive 616d-2 is being rebuilt to replace storage drive 616d. Unit 606a and unit 606b store data with a higher priority than the data of unit 606c. So, in implementing a service-level rebuild on example architecture 600, data corresponding to unit 606a and unit 606b can be written to storage drive 606d-2 before data corresponding to unit 606c is written to storage drive 606d-2. In some examples, this order of writing data to storage drive 606d-2 can be performed independently of where the data that is being written is to be stored on storage drive 606d-2. That is, in some examples, a priority for data is not based on that data's physical location on a storage drive.

Example Process Flows

FIG. 7 illustrates an example process flow for service-level rebuild, in accordance with certain embodiments of this disclosure. It can be appreciated that process flow 700 is an example process flow, and that there can be embodiments that implement more or fewer operations than are depicted in process flow 700, or that implement the operations of process flow 700 in a different order than is depicted in process flow 700.

In some examples, aspects of process flow 700 can be implemented with service-level restoration component 112 of FIG. 1 as service-level restoration component 112 provides service-level restoration functionality while rebuilding a storage drive of storage pool 110 (such as rebuilding storage drive 116a). Process flow 700 begins with 702, and then moves to operation 704.

Operation 704 depicts determining to rebuild a failed storage drive with a first storage drive of a group of storage drives. That is, there can be multiple storage drives that have redundancy (e.g., a RAID group), where at least one drive has failed, and that failed drive can be replaced with a new drive. The data on this new drive (e.g., the first storage drive) can be populated from data on existing drives of the group of storage drives to rebuild the new drive. In some examples, operation 704 comprises determining to rebuild a failed storage drive with a first storage drive of storage drives.

In some examples, operation 704 comprises determining to rebuild data to the first storage drive based on data stored on the set of storage drives, or copying data from at least a second storage drive of the set of storage drives. That is rebuilding a storage drive can include copying the contents of another drive to this new drive.

In some examples, the set of storage drives comprises a RAID array. A RAID array can implement redundancy (e.g., through use of parity information) that can be utilized in rebuilding a storage drive that has failed. In some examples, this redundancy can be expressed as, the set of storage drives comprises a second storage drive that contains first information that backs up second information of the first storage drive or a third storage drive of the set of storage drives, and wherein the set of storage drives are able to rebuild the second information based on the first information when the second information is lost.

In some examples, operation 704 comprises predicting a likelihood of the rebuilding the first storage drive based on monitoring physical inconsistent tracks of the storage drives over time. That is, a front-end storage group's physically inconsistent tracks can be monitored over time, and this information can be utilized to predict a likelihood that a storage drive will fail, leading to the storage drive being rebuilt.

After operation 704, process flow 700 moves to operation 706.

Operation 706 depicts determining first data and second data to write to the first storage drive, the first data having a first priority, the second data having a second priority, and the first priority being greater than the second priority. This first storage drive can be a replacement for a failed drive. There can be a priority of data, e.g., some of the data to be written can have a higher priority (or service level) than other data to be written in the course of the rebuild. Operation 706 can comprise identifying the priority of the data to be written in the course of a rebuild, so that it can be written based on its priority, where high priority data is written before lower priority data. In some examples, this writing of data based on priority can be performed regardless of a location of the data on a storage disk). That is, in some examples, the first priority is independent of a location on the first storage drive where the first data is written.

In some examples, there are more than two priority levels. For example, there can be embodiments that implement five priority levels. These five priority levels can be referred to as diamond, platinum, gold, silver, and bronze.

In some examples, operation 706 comprises determining first data and second data to write to the first storage drive, the first data having a first priority greater than a second priority of the second data. In some examples, operation 706 comprises determining first data and second data to write to the first storage drive, the first data having a first priority, and the second data having a second priority.

After operation 706, process flow 700 moves to operation 708.

Operation 708 depicts writing the first data to the first storage drive before writing the second data to the first storage drive. That is, operation 708 can comprise writing the data for the rebuild based on the data's priority.

In some examples, operation 708 comprises writing the first data to the first storage drive before writing the second data to the first storage drive, wherein the writing the first data to the first storage drive is attempted to be performed within a first defined amount of time. In some examples, operation 708 comprises, based on the first priority being determined to be greater than the second priority, writing the first data to the first storage drive before writing the second data to the first storage drive based on a prioritized use of a build bandwidth of the system based on a determined risk of the set of storage drives having data loss.

In some examples, the group of storage drives is a first consistency group, and operation 708 comprises prioritizing use of a rebuild bandwidth of the system between the first consistency group and a second consistency group based on a first determined risk of the first consistency group having first data loss, and a second determined risk of the second consistency group having second data loss. That is, a goal function can be evaluated to direct rebuild bandwidth in a weighted priority fashion.

In some examples where a goal function is utilized, operation 708 comprises modifying the prioritizing the use of the rebuild bandwidth of the system based on a first change to the first determined risk or a second change to the second determined risk. In some examples, these determined risks can be determined based on evaluating a goal function for various storage groups (and service levels of data stored on those storage groups) can be periodically evaluated (e.g., each five minutes), and how rebuild bandwidth of the system is being directed can be changed based on these updated goal functions.

In some examples where a goal function is utilized, the first determined risk is determined based on a degraded bytes of the first consistency group, and a degraded input/output rate of the first consistency group. That is, a goal function can be determined based on degraded bytes (which can be short-term degraded bytes and/or long-term degraded bytes, in some examples), and degraded IOPS (which can be long-term degraded IOPS, in some examples). Put another way, in some examples where a goal function is utilized, the first determined risk is determined based on a combination of short-term degraded bytes of the first consistency group, and long-term degraded bytes of the first consistency group.

In some examples where a goal function is utilized, the first determined risk is determined based on an EMA of the degraded bytes and of the degraded input/output rate. In some examples, this EMA can be a 2 EMA.

In some examples where a goal function is utilized, the first determined risk is initially based on a third determined risk of a third consistency group. That is, a baseline probability of state changes can be taken from other deployments while the current system is accumulating its own probabilities.

In some examples, operation 708 comprises predicting a likelihood of the rebuilding the first storage drive based on a Markov model. In some examples, operation 708 comprises resetting the first determined risk based on the first consistency group transitioning from a protected state to a degraded state. That is, a goal function can be reset when a corresponding Markov model used in service-level rebuild has a state transition from protected to degraded (such as in using state transition matrix 1000 of FIG. 10).

In some examples, the Markov model comprises states that indicate that the storage drives are fully protected, partially protected, unprotected, degraded, and critically degraded. These states can be, e.g., full 1006a or full 1006b, partial 1008a or partial 1008b, unprotected 1010a or unprotected 1010b, degraded 1018, and critical 1014a or critical 1014b of state transition matrix 1000 of FIG. 10.

In some examples where a Markov model is utilized, operation 708 comprises populating the Markov model with samples of degraded tracks of the first storage drive. That is, samples of degraded tracks can be dialed home periodically (e.g., daily) and used to populate the Markov model.

In some examples, operation 708 comprises in response to determining that the writing the first data to the first storage drive has not been performed within the first defined amount of time, increasing, by the system, a prioritization of rebuild bandwidth of the system to the writing the first data to the first storage drive. That is, when a time goal for writing a storage drive's high-level (or current-level of data being written) data is missed, a priority for writing it is increased. This increased priority can lead to using more rebuild bandwidth to rebuilding this particular storage drive.

In some examples, the writing the first data to the first storage drive is performed within a first defined amount of time. That is, a rebuild time for a storage drive can be set based on a service level for the data or the storage drive being rebuilt.

FIG. 8 illustrates an example process flow 800 for implementing a goal function for a service-level rebuild, in accordance with certain embodiments of this disclosure. It can be appreciated that process flow 800 is an example process flow, and that there can be embodiments that implement more or fewer operations than are depicted in process flow 800, or that implement the operations of process flow 800 in a different order than is depicted in process flow 800.

In some examples, aspects of process flow 800 can be implemented with service-level restoration component 112 of FIG. 1 as service-level restoration component 112 provides service-level restoration functionality while rebuilding a storage drive of storage pool 110 (such as rebuilding storage drive 116a). Process flow 800 begins with 802, and then moves to operation 804.

Operation 804 depicts determining short-term degraded bytes. In some examples, short-term degraded bytes can be those bytes on a storage drive (or within a storage group) that have degraded within a predefined time period, such as the last two hours. In some examples, this can be determined by sampling some bytes of the storage drive and checking them to see if they have degraded, then extrapolating a total number of short-term degraded bytes based on the results of this sampling. After operation 804, process flow 800 moves to operation 806.

Operation 806 depicts determining long-term degraded bytes. In some examples, short-term degraded bytes can be those bytes on a storage drive (or within a storage group) that have degraded within a predefined time period, such as bytes that degraded longer ago than the last two hours. In some examples, this can be determined by using an outdated measurement of short-term degraded bytes—since more time has passed, this measurement is now no longer one of short-term degraded bytes, but of long-term degraded bytes. After operation 806, process flow 800 moves to operation 808.

Operation 808 depicts determining long-term degraded IOPS. Long-term degraded IOPS can be determined by monitoring the IOPS for the storage drive (or storage group), and determining how this IOPS changes over time. After operation 808, process flow 800 moves to operation 810.

Operation 810 depicts determining a goal function based on short-term degraded bytes, long-term degraded bytes, and long-term degraded IOPS. In some examples, this goal function can be expressed as:

Goal=(Long-Term Degraded Bytes)*(Long-Term Degraded IOPS)*(Short-Term Degraded Bytes)/ (Long-Term Degraded Bytes)

After operation 810, process flow 800 moves to 812, where process flow 800 ends.

FIG. 9 illustrates an example process flow 900 for changing a priority for rebuild bandwidth, in accordance with certain embodiments of this disclosure. It can be appreciated that process flow 900 is an example process flow, and that there can be embodiments that implement more or fewer operations than are depicted in process flow 900, or that implement the operations of process flow 900 in a different order than is depicted in process flow 900.

In some examples, aspects of process flow 900 can be implemented with service-level restoration component 112 of FIG. 1 as service-level restoration component 112 provides service-level restoration functionality while rebuilding a storage drive of storage pool 110 (such as rebuilding storage drive 116a). Process flow 900 begins with 902, and then moves to operation 904.

Operation 904 depicts determining a goal function for each storage group. This goal function can be the goal function described with respect to process flow 800, and such a goal function can be evaluated for each storage group of a plurality of storage groups for a system. After operation 904, process flow 900 moves to operation 906.

Operation 906 depicts evaluating each storage group per service level. Within each storage group, data of multiple service levels can be stored (e.g., diamond data). This goal function as described with respect to process flow 800 can also be used to evaluate each service level of each storage group, in operation 906. After operation 906, process flow 900 moves to operation 908.

Operation 908 is reached from operation 906, or from operation 910 where it is determined that rebuilds are not complete. Operation 908 depicts directing rebuild bandwidth based on a highest remaining priority for a storage group. These goal functions evaluated in operation 904 and operation 906 can indicate a priority for directing rebuild bandwidth of the system (e.g., a higher result of evaluating a goal function for a particular storage group or service level can indicate a higher priority). Rebuild bandwidth can then be directed in accordance with the determined priorities for rebuilding. After operation 908, process flow 900 moves to operation 910.

Operation 910 depicts determining whether rebuilds are complete. It can be determined that rebuilds are complete when there are no outstanding rebuilds left to perform. Where it is determined in operation 910 that rebuilds are complete, process flow 900 moves to 912, where process flow 900 ends. Instead, where it is determined in operation 910 that rebuilds are not complete, process flow 900 returns to operation 908.

Example State Transition Matrix

FIG. 10 illustrates an example state transition matrix 1000 for a service-level rebuild, in accordance with certain embodiments of this disclosure. It can be appreciated that state transition matrix 1000 is an example state transition matrix, and that there can be state transition matrices with more, fewer, or different states and/or state transitions than are depicted here. In some examples, state transition matrix 1000 can be a state transition matrix for the state of a service group of hard disks that is utilized by a Markov process in the course of implementing a service-level rebuild.

In some examples, state transition matrix 1000 can be utilized by a Markov process of service-level restoration component 112 of FIG. 1 in implementing service-level restoration for storage pool 110. State transition matrix represents a set of states for the current state 1002 and a set of states for the next state 1004, which can be transitioned to from current state 1002.

The states of current states 1002 are depicted as full 1006a, partial 1008a, unprotected 1010a, marginal 1012a, critical 1014a, and data loss 1016a. The states of next state 1004 are depicted as full 1006b, partial 1008b, unprotected 1010b, marginal 1012b, degraded 1018, critical 1014b, and data loss 1016b.

The following are depicted transitions from a current state of full 1006a. A current state of full 1006a can transition 1020aa to a next state of full 1006b where there is normal behavior by the storage group. A current state of full 1006a can transition 1010ab to a next state of partial 1008b where some hot spare drives of the storage group have failed or have been removed from the storage group. A current state of full 1006a can transition 1020ac to a next state of unprotected 1010b where all hot spare drives of the storage group have failed or have been removed from the storage group. A current state of full 1006a can transition 1020ad to a next state of marginal 1012b where a single member of a RAID group fails. A current state of full 1006a can transition 1020ae to a next state of degraded 1018 where a single member of a RAID group fails, and all hot spares of the storage group have been removed. A current state of full 1006a can transition 1020af to a next state of critical 1014b when multiple RAID groups within a single member fail. A current state of full 1006a can transition 1020ag to a next state of data loss when multiple members of a RAID group fail, leaving data unrecoverable.

The following are depicted transitions from a current state of partial 1008a. A current state of partial 1008a can transition 1020ba to a next state of full 1006b where hot spares for a storage group are fully replenished. A current state of partial 1008a can transition 1010ab to a next state of partial 1008b where the storage group is still waiting for enough spares to be added. A current state of partial 1008a can transition 1020bc to a next state of unprotected 1010b where all hot spares of a storage group are failed or are removed. A current state of partial 1008a can transition 1020bd to a next state of marginal 1012b where a single member of a RAID group fails. A current state of partial 1008a can transition 1020be to a next state of degraded 1018 where a single member of a RAID group fails, and all hot spares of the storage group have been removed. A current state of partial 1008a can transition 1020bf to a next state of critical 1014b when multiple RAID groups within a single member fail. A current state of partial 1008a can transition 1020bg to a next state of data loss when multiple members of a RAID group fail, leaving data unrecoverable.

The following are depicted transitions from a current state of unprotected 1010a. A current state of unprotected 1010a can transition 1020ca to a next state of full 1006b where hot spares for a storage group are fully replenished. A current state of unprotected 1010a can transition 1010ab to a next state of partial 1008b where some spares are added to the storage group, but fewer than the minimum number of spares to be considered full. A current state of unprotected 1010a can transition 1020cc to a next state of unprotected 1010b where the storage group is waiting for enough spares to be added to the storage group. A current state of unprotected 1010a can transition 1020cd to a next state of marginal 1012b where a single member of a RAID group fails at the same time that a hot spare is added. A current state of unprotected 1010a can transition 1020ce to a next state of degraded 1018 where a single member of a RAID group fails. A current state of unprotected 1010a can transition 1020cf to a next state of critical 1014b when multiple RAID groups within a single member fail. A current state of unprotected 1010a can transition 1020cg to a next state of data loss when multiple members of a RAID group fail, leaving data unrecoverable.

The following are depicted transitions from a current state of marginal 1012a. A current state of marginal 1012a can transition 1020da to a next state of full 1006b where a rebuild completes and hot spares are fully replenished for a storage group. A current state of marginal 1012a can transition 1010ab to a next state of partial 1008b where a rebuild completes, and some hot spares exist, but fewer than the minimum number of spares to be considered full. A current state of marginal 1012a can transition 1020dc to a next state of unprotected 1010b where a rebuild completes, but there are no hot spares remaining for the storage group. A current state of marginal 1012a can transition 1020dd to a next state of marginal 1012b where a single member rebuild for the storage group is progressing. A current state of marginal 1012a can transition 1020de to a next state of degraded 1018 where a hot spare fails during a single-member rebuild in the storage group. A current state of marginal 1012a can transition 1020df to a next state of critical 1014b where a rebuild takes too long, or another RAID group has a failure. A current state of marginal 1012a can transition 1020dg to a next state of data loss where another member fails in the RAID group before the rebuild completes.

The following are depicted transitions from a current state of critical 1014a. A current state of critical 1014a can transition 1020ea to a next state of full 1006b where all rebuilds are complete and hot spares are fully replenished for a storage group. A current state of critical 1014a can transition 1010ab to a next state of partial 1008b where all rebuilds are complete, and some spares exist for the storage group, though fewer spares than the minimum to be considered full. A current state of critical 1014a can transition 1020ec to a next state of unprotected 1010b where all rebuilds complete with no hot spares remaining for the storage group. A current state of critical 1014a can transition 1020ed to a next state of marginal 1012b where some rebuilds complete, with only one rebuild remaining for the storage group. A current state of critical 1014a can transition 1020ee to a next state of degraded 1018 where a rebuild is complete, but other failures remain without any spares. A current state of critical 1014a can transition 1020ef to a next state of critical 1014b where the storage group has not yet been serviced, or another failure occurs. A current state of critical 1014a can transition 1020eg to a next state of data loss where another member fails in the RAID group before the rebuild completes.

The following are depicted transitions from a current state of data loss 1016a. A current state of data loss 1016a can transition 1020fa to a next state of full 1006b where there is data recovery that is external to the storage group, and full spare replenishment for the storage group. A current state of data loss 1016a can transition 1010ab to a next state of partial 1008b where there is data recovery that is external to the storage group, and fewer spares than the minimum number of spares for the storage group. A current state of data loss 1016a can transition 1020fc to a next state of unprotected 1010b where there is data recovery that is external to the storage group, and no spares for the storage group. A current state of data loss 1016a can transition 1020fd to a next state of marginal 1012b where there is data recovery that is external to the storage group, and another rebuild is progressing. A current state of data loss 1016a can transition 1020fe to a next state of degraded 1018 where there is data recovery that is external to the storage group, and a single failure remains in the storage group. A current state of data loss 1016a can transition 1020ff to a next state of critical 1014b where there is data recovery that is external to the storage group, and multiple failures remain in the storage group. A current state of data loss 1016a can transition 1020fg to a next state of data loss where a storage group is waiting on external data recovery.

Example Operating Environment

Figure 11:
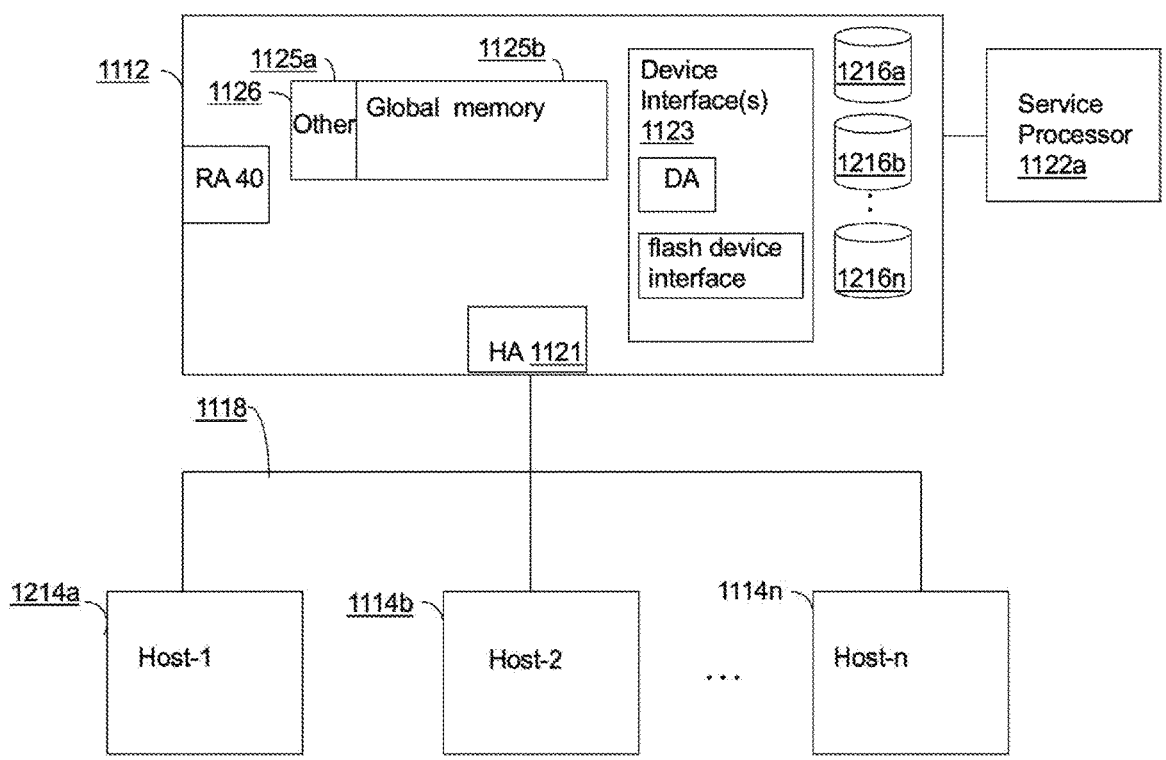
FIG. 11 illustrates an example of an embodiment of a system that may be used in connection performing certain embodiments of this disclosure.

To provide further context for various aspects of the subject specification, FIG. 11 illustrates an example of an embodiment of a system 1100 that may be used in connection performing certain embodiments of this disclosure. For example, aspects of system 1100 can be used to implement aspects of client computer 102, storage system 104, and computer network 106 of FIG. 1. In some examples, system 1100 can implement aspects of the operating procedures of process flow 700 of FIG. 7, process flow 800 of FIG. 8, and/or process flow 900 of FIG. 9 to implement service-level rebuild functionality.

FIG. 11 illustrates an example of an embodiment of a system 1100 that may be used in connection performing certain embodiments of this disclosure. The system 1100 includes a data storage system 1112 connected to host systems 1114a-14n through communication medium 1118.

In this embodiment of the computer system 1100, and the n hosts 1114a-14n may access the data storage system 1112, for example, in performing input/output (I/O) operations or data requests. The communication medium 1118 may be any one or more of a variety of networks or other type of communication connections as known to those skilled in the art. The communication medium 1118 may be a network connection, bus, and/or other type of data link, such as a hardwire or other connections known in the art. For example, the communication medium 1118 may be the Internet, an intranet, network (including a Storage Area Network (SAN)) or other wireless or other hardwired connection(s) by which the host systems 1114a-14n may access and communicate with the data storage system 1112, and may also communicate with other components included in the system 1100.

Each of the host systems 1114a-14n and the data storage system 1112 included in the system 1100 may be connected to the communication medium 1118 by any one of a variety of connections as may be provided and supported in accordance with the type of communication medium 1118. The processors included in the host computer systems 1114a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 1112 are described herein in more detail, and may vary with each particular embodiment. Each of the host computers 1114a-14n and data storage system may all be located at the same physical site, or, alternatively, may also be located in different physical locations. Examples of the communication medium that may be used to provide the different types of connections between the host computer systems and the data storage system of the system 1100 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 11, any one of the host computers 1114a-14n may issue a data request to the data storage system 1112 to perform a data operation. For example, an application executing on one of the host computers 1114a-14n may perform a read or write operation resulting in one or more data requests to the data storage system 1112.

It should be noted that although element 1112 is illustrated as a single data storage system, such as a single data storage array, element 1112 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 1112 may be a data storage array including a plurality of data storage devices 1116a-16n. The data storage devices 1116a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 1116a-16n are flash drives or devices. More generally, the techniques herein may also be used with any type of SSD although following paragraphs may make reference to a particular type such as a flash device or flash memory device.

The data storage array may also include different types of adapters or directors, such as an HA 1121 (host adapter), RA 1140 (remote adapter), and/or device interface 1123. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 1121 may be characterized as a front end component of the data storage system which receives a request from the host. The data storage array may include one or more RAs that may be used, for example, to facilitate communications between data storage arrays. The data storage array may also include one or more device interfaces 1123 for facilitating data transfers to/from the data storage devices 1116a-16n. The data storage interfaces 1123 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 1123, the RAs 1140, the HAs 1121, and the memory 1126. An embodiment, for example, may use one or more internal busses and/or communication modules. For example, the global memory portion 1125b may be used to facilitate data transfers and other communications between the device interfaces, HAs and/or RAs in a data storage array. In one embodiment, the device interfaces 1123 may perform data operations using a cache that may be included in the global memory 1125b, for example, when communicating with other device interfaces and other components of the data storage array. The other portion 1125a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 1116a-16n of the storage systems directly, but rather access to data may be provided to one or more host systems from what the host systems view as a plurality of logical devices or logical volumes (LVs). The LVs may or may not correspond to the actual physical devices or drives 1116a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 1116a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 1116a-16n. For example, a device interface may be a DA that accomplishes the foregoing by creating job records for the different LVs associated with a particular device. These different job records may be associated with the different LVs in a data structure stored and managed by each device interface.

Also shown in FIG. 11 is a service processor 1122a that may be used to manage and monitor the system 1112. In one embodiment, the service processor 1122a may be used in collecting performance data, for example, regarding the I/O performance in connection with data storage system 1112. This performance data may relate to, for example, performance measurements in connection with a data request as may be made from the different host computer systems 1114a 1114n. This performance data may be gathered and stored in a storage area. Additional detail regarding the service processor 1122a is described in following paragraphs.

It should be noted that a service processor 1122a may exist external to the data storage system 1112 and may communicate with the data storage system 1112 using any one of a variety of communication connections. In one embodiment, the service processor 1122a may communicate with the data storage system 1112 through three different connections, a serial port, a parallel port and using a network interface card, for example, with an Ethernet connection. Using the Ethernet connection, for example, a service processor may communicate directly with DAs and HAs within the data storage system 1112.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the first processor, facilitate performance of operations, comprising:
   determining to rebuild a failed storage drive with a first storage drive of a group of storage drives;
   determining first data and second data to write to the first storage drive, the first data having a first priority, the second data having a second priority, and the first priority being greater than the second priority; and
   based on the first priority being greater than the second priority and based on a prioritized use of a build bandwidth of the system corresponding to a determined risk that the set of storage drives has experienced data loss, writing the first data to the first storage drive before writing the second data to the first storage drive.

2. The system of claim 1, wherein the group of storage drives is a first consistency group, and wherein the operations further comprise:
   prioritizing use of a rebuild bandwidth of the system between the first consistency group and a second consistency group based on a first determined risk of the first consistency group having first data loss, and a second determined risk of the second consistency group having second data loss.

3. The system of claim 2, wherein the operations further comprise:
   modifying the prioritizing the use of the rebuild bandwidth of the system based on a first change to the first determined risk or a second change to the second determined risk.

4. The system of claim 2, wherein the first determined risk is determined based on a degraded bytes of the first consistency group, and a degraded input/output rate of the first consistency group.

5. The system of claim 4, wherein the first determined risk is determined based on an exponential moving average of the degraded bytes and of the degraded input/output rate.

6. The system of claim 2, wherein the first determined risk is determined based on a combination of short-term degraded bytes of the first consistency group, and long-term degraded bytes of the first consistency group.

7. The system of claim 2, wherein the operations further comprise:
   resetting the first determined risk based on the first consistency group transitioning from a protected state to a degraded state.

8. The system of claim 2, wherein the first determined risk is initially based on a third determined risk of a third consistency group.

9. A method, comprising:
   determining, by a system comprising a processor, to rebuild a failed storage drive with a first storage drive of storage drives;
   determining, by the system, first data and second data to write to the first storage drive; and
   writing, by the system, the first data to the first storage drive before writing the second data to the first storage drive, based on a first priority of the first data being determined to be greater than a second priority of the second data, and based on a prioritized use of a build bandwidth of the system, wherein the prioritized use is determined as a function of a determined risk that the set of storage drives has a data loss.

10. The method of claim 9, further comprising:
in response to determining that the writing the first data to the first storage drive has not been performed within the first defined amount of time, increasing, by the system, a prioritization of rebuild bandwidth of the system to the writing the first data to the first storage drive.

11. The method of claim 9, further comprising:
predicting, by the system, a likelihood of the rebuilding the first storage drive based on a Markov model.

12. The method of claim 11, wherein the Markov model comprises states that indicate that the storage drives are fully protected, partially protected, unprotected, degraded, and critically degraded.

13. The method of claim 11, further comprising:
populating, by the system, the Markov model with samples of degraded tracks of the first storage drive.

14. The method of claim 9, further comprising:
predicting, by the system, a likelihood of the rebuilding the first storage drive based on monitoring physical inconsistent tracks of the storage drives over time.

15. A non-transitory computer-readable medium comprising instructions that, in response to execution, cause a system comprising a processor to perform operations, comprising:
determining to rebuild a failed storage drive with a first storage drive of a set of storage drives;
determining first data and second data to write to the first storage drive, the first data having a first priority, and the second data having a second priority; and
based on the first priority being determined to be greater than the second priority, writing the first data to the first storage drive before writing the second data to the first storage drive based on a prioritized use of a build bandwidth of the system based on a determined risk of the set of storage drives having data loss.

16. The non-transitory computer-readable medium of claim 15, wherein the first priority is independent of a location on the first storage drive where the first data is written.

17. The non-transitory computer-readable medium of claim 15, wherein the writing the first data to the first storage drive is prioritized so that it is performed within a first defined amount of time.

18. The non-transitory computer-readable medium of claim 15, wherein the determining to rebuild the first storage drive comprises:
determining to rebuild data to the first storage drive using data stored on the set of storage drives, or by copying data from at least a second storage drive of the set of storage drives.

19. The non-transitory computer-readable medium of claim 15, wherein the set of storage drives comprises a redundant array of independent disks (RAID) array.

20. The non-transitory computer-readable medium of claim 15, wherein the set of storage drives comprises a second storage drive that contains first information that backs up second information of the first storage drive or a third storage drive of the set of storage drives, and wherein the set of storage drives are able to rebuild the second information based on the first information when the second information is lost.

* * * * *